(12) United States Patent
Popp et al.

(10) Patent No.: US 6,508,742 B2
(45) Date of Patent: Jan. 21, 2003

(54) PROCEDURE FOR IMPROVEMENT OF THE SHIFTING SPEED

(75) Inventors: Christian Popp, Kressbronn (DE); Klaus Steinhauser, Kressbronn (DE); Gerald Klein, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/900,437

(22) Filed: Jul. 6, 2001

(65) Prior Publication Data

US 2002/0019292 A1 Feb. 14, 2002

(30) Foreign Application Priority Data

Jul. 21, 2000 (DE) ......................................... 100 35 479

(51) Int. Cl.$^7$ .............................................. F16H 61/04
(52) U.S. Cl. ...................................... 477/155; 475/127
(58) Field of Search ................................. 475/127, 128; 477/155

(56) References Cited

U.S. PATENT DOCUMENTS 5,997,436 A * 12/1999 Shibuya et al. .............. 477/154
6,007,458 A * 12/1999 Ohashi et al. ............... 477/154

* cited by examiner

*Primary Examiner*—Dirk Wright
(74) *Attorney, Agent, or Firm*—Davis & Bujold, P.L.L.C.

(57) ABSTRACT

Within the scope of the procedure for improvement of the shifting speed of automatic transmissions, at each gear shift at least one engaging or disengaging shifting element needed for the next gear shift in the same direction is prepared or lowered to shifting pressure during the gear shift in a manner such that when the synchronous rotational speed is reached, it is made possible immediately to carry out the next gear shift.

16 Claims, 2 Drawing Sheets

PROCEDURE FOR IMPROVEMENT OF THE SHIFTING SPEED

FIELD OF THE INVENTION

Figure 1:
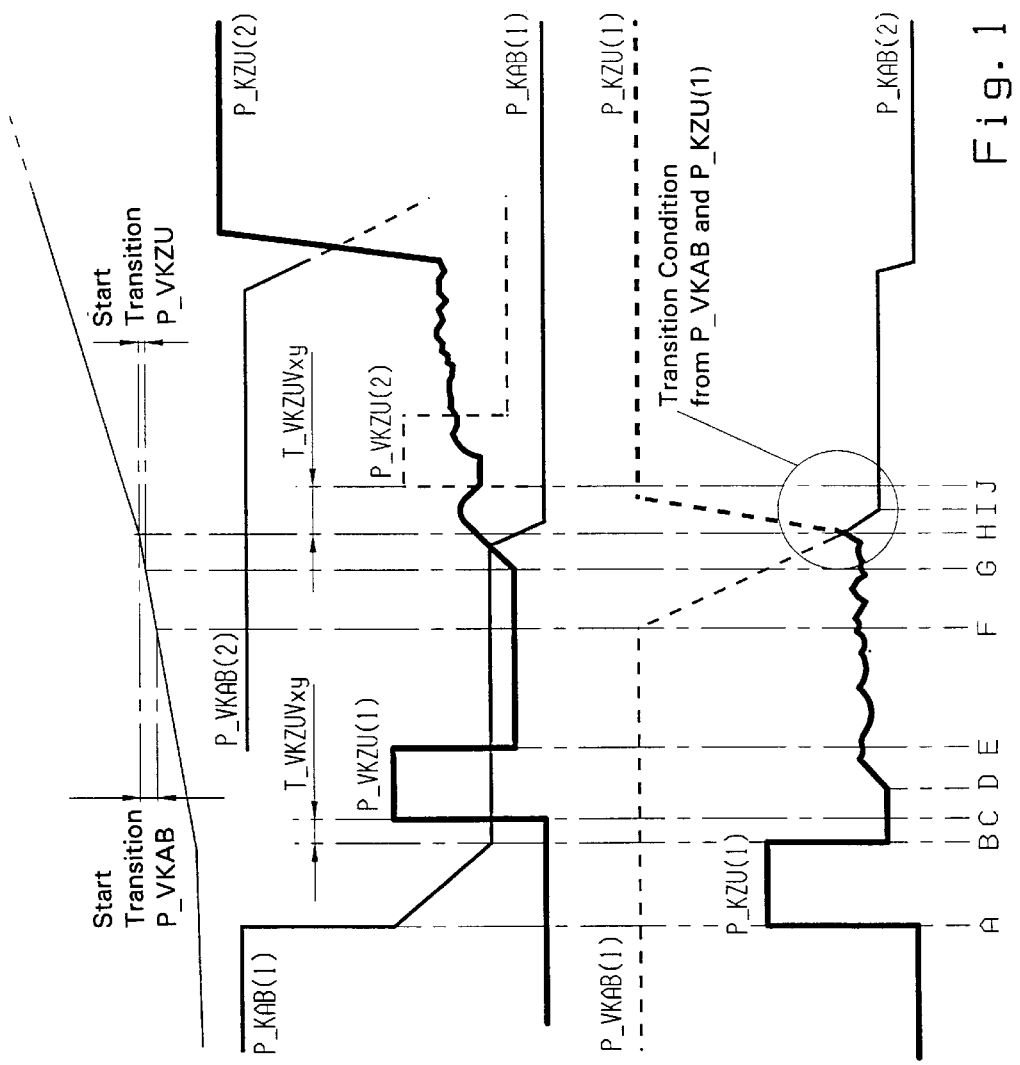

According to the preamble of claim 1, the invention concerns a procedure for improvement of the shifting speed of automatic transmissions.

BACKGROUND OF THE INVENTION

The continuously increasing demands on the functionality of automatic transmissions by requiring more spontaneity, the continuously increasing number of gears to be shifted, the consumption-optimized design of the automatic transmissions with larger driving components in the high gears, the same as the great number of downshifts to be carried out when decelerating the vehicle until stoppage, result in the gears of an automatic transmission having to be shifted more and more quickly and often consecutively.

The engaging shifting element must first be prepared or filled to perform a gear change for taking over the torque. Preparatory steps can also be provided on the disengaging element, this being possible only after termination of the preceding gear shift.

The preparatory filling operation of a shifting element is usually divided into a rapid filling phase and a filling equalization phase: during the rapid filling phase the shifting element is filled with oil whereas in the filling equalization phase the piston is built with smaller load.

The performance of the preparation of the engaging shifting elements which, as explained, is divided into a rapid filling phase and a filling equalization phase, and the preparation of the disengaging shifting elements give rise to delay times in which the change of rotational speed to the next ratio step does not proceed continuously but remains at the synchronous rotational speed of the preceding gear shift; this results in a detectable step in the rotational speed change whereby the shifting comfort is also negatively affected.

The problem on which the invention is based is to develop a procedure by means of a shifting element can pass over to the shifting phase without delay so that the rotational speed curve can be continuously carried on.

This problem is solved by the features of claim 1. Other developments and variations result from the sub-claims.

SUMMARY OF THE INVENTION

It is proposed at each gear shift to prepare, to fill or lower to shifting pressure during the gear shift, the engaging or disengaging shifting element needed for the next gear shift in the same direction, that is, a second after a first upshift or a second after a first downshift.

Thereby is immediately made possible to carry out the next gear shift upon reaching the synchronous rotational speed. The moment of transition from the preparatory to the shifting phase is determined by adequate application parameters.

The engaging and disengaging shifting elements for the subsequent gear shift can be prepared during the current gear shift by control of several parallel sequences according to the invention.

The invention procedure can also be used for combinations of several engaging and disengaging shifting elements. Parallel sequences can correspond to active pressure-preconditions or constitute virtual sequences going on in the background, transitions between the sequences occurring at defined moments.

The procedure is further adequate for preparing several shifting elements for subsequent gear shifts when a gear is introduced. The shifting elements can also take part in the gear introduction. When introducing a gear while the vehicle is stopped, the shifting elements that are prepared are conveniently those which have to be engaged or disengaged during a subsequent upshift. When the gear is introduced during motion there can also be prepared for a possible subsequent gear shift, all those shifting elements that can be controlled out of the actually engaged gear while the gear is introduced, that is, the shifting elements both of the next higher and the next lower gears. In the same manner is also possible, for example, to prepare a converter lock-up clutch for future gear shifts in order to obtain a rotational speed curve without transition during WK shifts that follow.

The engagement operation of the shifting element is divided in a preparatory phase consisting of the rapid filling phase and the filling equalization phase, the same as a shifting phase in which the torque in actually taken over. The disengaging shifting element is likewise divided in one phase corresponding to a defined pressure (i.e., maximum pressure, fixing valve pressure . . . ) and one transition phase to the shifting pressure carried out according to specific criteria (i.e. starting moment, transition ramps, pressure drop or jump . . . ).

According to the invention when a gear shift is carried out, the preparatory phase of the engaging shifting element for the next gear shift is carried out during the prior gear shift according to specific criteria. Thereby is obtained that the shifting element passes over without delay to the shifting phase, the rotational speed curve continuously going on, since the shifting element is always ready to take over the torque.

The disengaging shifting element of the following gear shift is likewise prepared in the meanwhile and at a defined point, when the next gear shift is recognized as current, passes over to the transition phase.

When no gear shift has to be effected, the preparatory phase of the participating shifting elements is interrupted without consequence.

At the point at which the new shifting element to be engaged passes over to the shifting phase, the further gear shift sequence, according to the invention, is controlled with reference to an applicable transition condition specific to shifting (such as a defined minimum or maximum variety of pressure curves). In this transition condition both the actual state of the engaging shifting element on the pressure or rotational side and the control curve which proceeds in the background and constitutes the preparation of the new disengaging shifting element are taken into account. By this procedure, a continuous rotational speed change over several gears without steps forming in the respective synchronous rotational speeds results.

This time is spared by the transfer of the preparatory phase to the respective preceding gear shift so that a higher number of gear shifts are made possible during the same space of time.

By virtue of the inventive procedure, a higher number of gear shifts to be preformed is covered when decelerating owing to the design of the transmissions consumption optimized by the higher gear rotational speeds of the present automatic transmissions and the increased driving components in high gears. Besides, shifting operations during stoppage are reduced.

Because of the possibilities of accelerated performance of gear shifts, no more steps are needed in the mechanics, hydraulics and software in order to produce gear shifts over several gears (e.g., 6-4, 5-3, 5-1, . . . ). This results in simplification of the mechanics and hydraulics. In addition, a reduction is obtained in application expenses and in the memory needed in the electronic transmission control. This also acts positively on the software quality, since a smaller number of gear shifts has to be tested. These points lead to a considerable economy in time and expenses for the development of the transmission.

BRIEF DESCRIPTION OF THE DRAWING(S)

Figure 2:
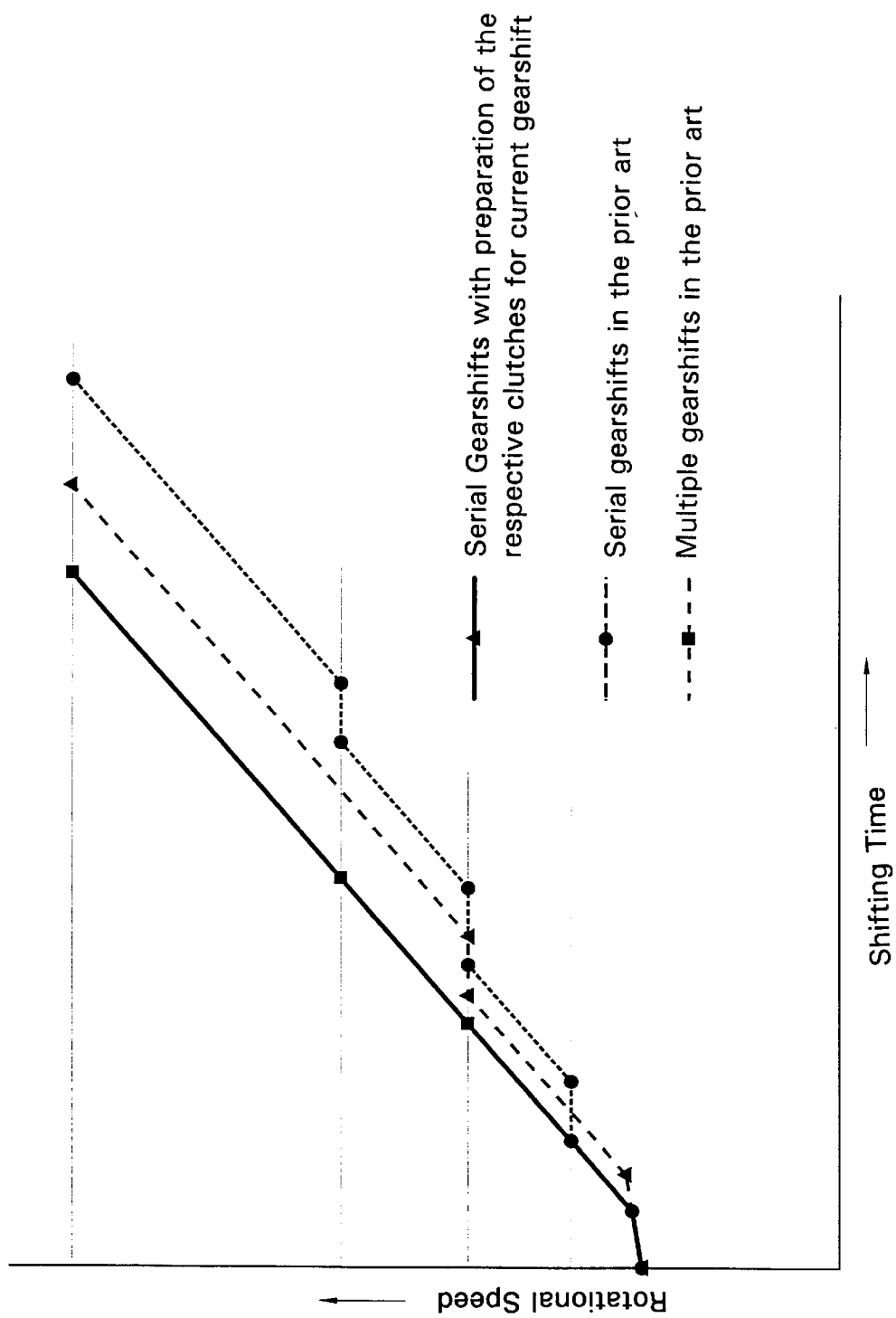

The procedure is explained in detail below with the example of a gear shift with reference to the drawings wherein:

FIG. 1 represents, by way of example, a gear shift with the preparatory phase of the next gear shift and of the transition between two gear shifts according to this invention; and FIG. 2 represents, by way of example, a rotational speed curve during shifting operations according to the invention and according to the prior art.

DETAILED DESCRIPTION OF THE INVENTION

According to FIG. 1, the preparation of the engaging shifting element P_KZU(1) starts, by way of example, when introducing a coasting downshift with the rapid filling of the shifting element. The disengaging shifting element P_KAB(1) begins with the shifting phase. The prepared engaging shifting element P_VKZU(1) remains at minimum pressure. The prepared disengaging shifting element P_VKAB(1) is set at a defined pressure. This moment is designated with A in FIG. 1.

Then the engaging shifting element P_KZU(1) (point B in FIG. 1) changes within the preparatory phase to the filling equalization phase. The conditions of the other sequences do not change.

While the conditions of the shifting elements P_KZU(1), P_KAB(1) and of the prepared disengaging shifting element P_VKAB(1) pertaining to the gear shift do not change, according to the invention, the preparatory phase of the engaging shifting element P_VKZU(1) to be prepared for the next gear shift begins with the rapid filling at the moment C, as shown in FIG. 1. The moment of the preparation, that is, the starting point of P_VKZU(1), is applicable and can be controlled according to time and also to eventualities. An example for a time control is a delay time T_VKZUVxy in FIG. 1. An example for the eventuality control is a rotational speed allowance (not shown) before the synchronous rotational speed of the current gear shift.

As assumption for the beginning of the preparatory phase is the presence of specific conditions, such as a time delay, after the rapid filling of the engaging shifting element P_KZU(1). The beginning moment of the preparatory phase can, therefore, be controlled in wide limits by application parameters specific to shifting.

The engaging shifting element P_KZU(1) then changes from the preparatory phase to the shifting phase, the phases of the other shifting elements remaining unchanged. This is induced by a pressure increase at moment D.

According to the invention, the prepared engaging shifting element P_VKZU(1) passes within the preparatory phase over to a phase of constant pressure introduced by lowering the pressure to the level of the filling equalization pressure (point E).

In a next step, during a defined subsequent moment F, the transition phase of the prepared disengaging shifting element P_VKAB(1) starts: the transition can be defined, for example, by an applicable rotational speed behavior before the synchronization point of the current gear shift. Instead of this eventual control, a time control can obviously be provided. The conditions of the other shifting elements do not change. In every case, therefore, the moment at which the transition from the preparatory phase to the shifting phase occurs can be controlled in wide limits by application parameters specific to shifting.

At this defined point (e.g., by a rotational speed allowance before the synchronization) the prepared engaging shifting element P_VKZU(1) leaves the filling equalization of the preparatory phase and passes over to the shifting phase, the transition preferably slopingly proceeds. The conditions of the other shifting elements remain unchanged. This phase corresponds to point C in FIG. 1.

The transition takes place between the sequence of the prepared disengaging shifting element P_VKAB(1) (e.g., background sequence) and of the first engaging shifting element P_KZU(1) (point H in FIG. 1) the change being effected between the background sequence and the active sequence. The shifting element P_KZU(1) prepared in the first gear shift becomes the engaging shifting element P_KZU(2) of the gear shift that follows. The first disengaging shifting element P_KAB(1) is disconnected.

The prepared shifting elements P_VKZU(1) and P_VKAB(1) (point I) of the first gear shift are now the active shifting elements P_KZU(2) and P_KAB(2) of this gear shift while the shifting elements needed for the next gear shift (P_VKZU(2) and P_VKAB(2)), as explained above, are prepared. This is carried out with the shifting element P_VKZU(2) needed for the engagement at a point (see point J in FIG. 1) defined by a time delay after the transition.

According to the invention, the outlined sequence repeats itself for all consecutive gear shifts that follow when another gear shift is required. The sequence then starts again at point A. But if no other gear shift is required, the invention transition from preparatory phase to shifting phase does not occur and the prepared engaging clutch (P_VKZU(1) in FIG. 1) is disengaged without consequence.

The inventive procedure shown in FIG. 1 with the example of a coasting downshift can also be used for all other kinds of gear shifts in which one clutch is engaged and one clutch disengaged, respectively. The parametrization of the application parameters differs according to shifting specifics.

In FIG. 2, the differences of the invention from the prior art with the example of the rotational speed curve as function of time are outlined.

Three curves over four gear shifts are shown: the solid line corresponds to a serial gear shift with preparation of the respective clutches for the gear shifts that follow in accordance with the invention whereas the short dotted line represents the rotational speed curve in the same situation in accordance with the prior art and the long dotted line the rotational speed curve for multiple gear shifts in accordance with the prior art.

The comparison between the inventive procedure and the prior art makes the advantages of the invention clear: the rotational speed change proceeds continuously; in addition the maximum rotational speed is reached substantially earlier than according to the conventional procedure.

Due to inquiry regarding the possibility of carrying out the multiple gear shifts, according to the prior art, in multiple gear shifts delays also result the beginning of the shift with the consequence of a discontinuity of the rotational speed curve and a corresponding delay.

What is claimed is:

1. A process for increasing the shifting speed of consecutive upshifts and consecutive downshifts in automatic transmissions, the process comprising the steps of:

performing a first gear shift;

adjusting a shifting pressure of a shifting element for a second gear shift during a current first gear shift to obtain a synchronous rotation speed between the shifting element for the second gear shift and the current first gear shift;

performing a second gear shift by one of engaging and disengaging the shifting element for the second gear shift when the shifting element reaches a synchronous rotational speed with the current first shift to immediately carry out the second gear shift following the first gear shift.

2. The process according to claim 1, further comprising the step of selecting a starting point for preparing the shifting element for the second gear shift according to desired shifting parameters.

3. The process according to claim 1, further comprising the step of providing a transition period from preparing the shifting element for the second gear shift to a shifting phase according to desired shifting parameters.

4. The process according to claim 1, further comprising the step of dividing the step of preparing the shifting element for the second gear shift into a rapid pressure adjustment phase and a pressure equalization phase.

5. The process according to claim 1, further comprising the step of interrupting the step of preparing the shifting element for the second gear shift when no second shift has to be effected.

6. The process according to claim 1, further comprising the step of preparing a plurality of shifting elements for respective second shifts during the current first shift by manipulating several parallel preparation sequences.

7. The process according to claim 1, further comprising the step of preparing the shifting element for upshifts and downshifts which can be affected as subsequent upshifts and downshifts prepared while a gear is introduced.

8. The process according to claim 1, further comprising the steps of providing a converter lock-up clutch as the shifting element and preparing the converter lock-up clutch for one of engagement and disengagement during the current first gear shift.

9. A process for increasing a shifting speed for consecutive upshifts and for consecutive downshifts of an automatic transmission, the process comprising the steps of:

performing a first gear shift utilizing a first shift element;

adjusting a shifting pressure of a shifting element for a second gear shift during the first gear shift to obtain a synchronous rotation speed between the shifting element for the second gear shift and the shifting element for the first gear shift; and performing a second gear shift by one of engaging and disengaging the second shifting element when the second shifting element reaches a synchronous rotational speed with the first shift element to carry out immediately the second gear shift following the first gear shift.

10. The process according to claim 9, further comprising the step of selecting a starting point for preparing the shifting element for the second gear shift according to desired shifting parameters.

11. The process according to claim 9, further comprising the step of providing a transition period from preparing the shifting element for the second gear shift to a shifting phase according to desired shifting parameters.

12. The process according to claim 9, further comprising the step of dividing the step of preparing the shifting element for the second gear shift into a rapid pressure adjustment phase and a pressure equalization phase.

13. The process according to claim 9, further comprising the step of interrupting the step of preparing the shifting element for the second gear shift when no second shift is to be effected.

14. The process according to claim 9, further comprising the step of preparing a plurality of shifting elements for respective second shifts during the first shift by manipulating several parallel preparation sequences.

15. The process according to claim 9, further comprising the step of preparing the shifting element for upshifts and downshifts which can be affected as subsequent upshifts and downshifts prepared while a gear is introduced.

16. The process according to claim 9, further comprising the steps of providing a converter lock-up clutch as the shifting element and preparing the converter lock-up clutch for one of engagement and disengagement during the first gear shift.

* * * * *